Jan. 15, 1929.  A. MARTIN  1,698,801
ELECTRIC WATER HEATER
Filed Nov. 20, 1924
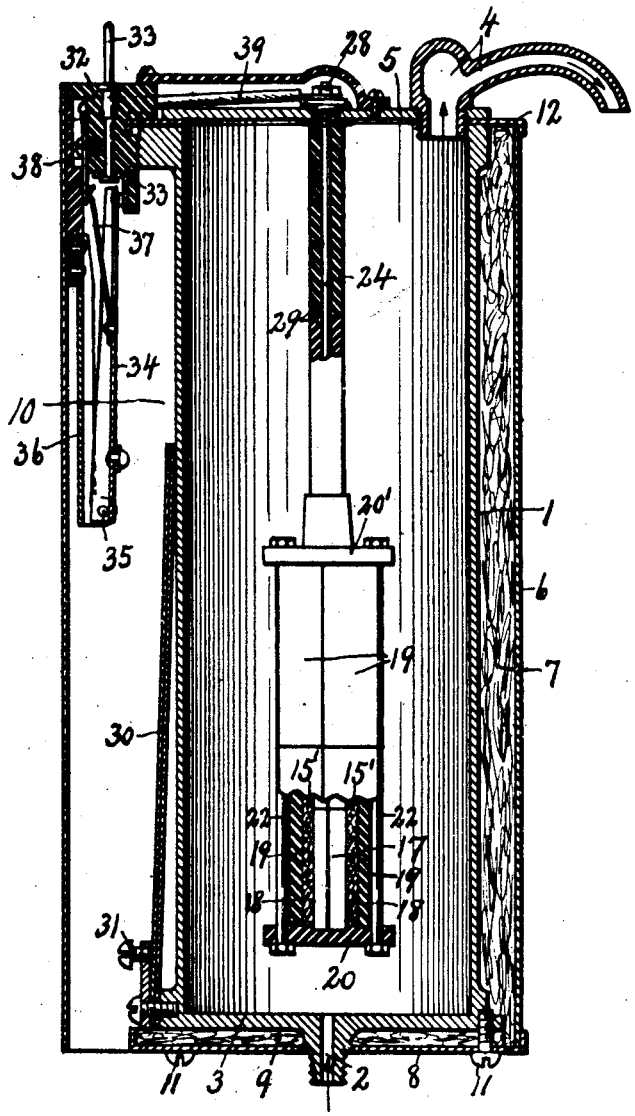
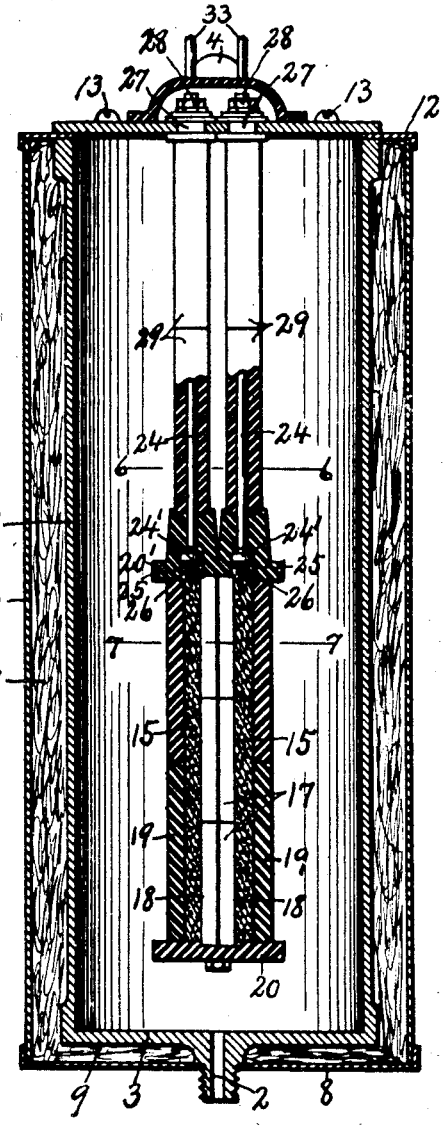
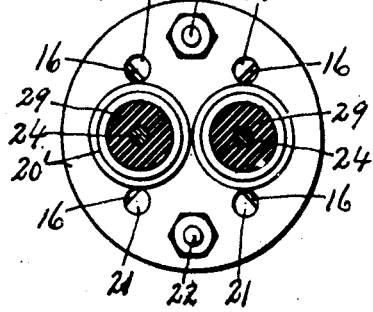
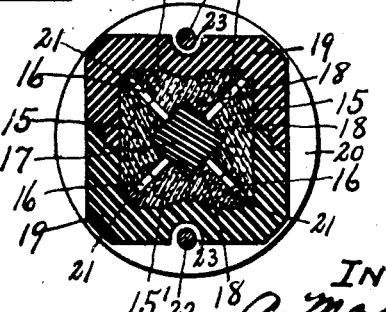
INVENTOR
A. Martin
BY Denton & Thompson
ATTORNEYS
WITNESS
H. W. Hurst Patented Jan. 15, 1929.

1,698,801

UNITED STATES PATENT OFFICE.

ALPHONSE MARTIN, OF OGDENSBURG, NEW YORK.

ELECTRIC WATER HEATER.

Application filed November 20, 1924. Serial No. 751,065.

This invention relates to electric water heaters of the class set forth in my pending application Serial No. 665,168, filed September 27, 1923 except as to certain differences in the construction of the electrodes and their relation to the container and body of water therein and also the construction of the thermostatic switch for controlling the temperature of the water in the container.

The main object of the invention is to provide simple and efficient means for storing a limited quantity of hot water and automatically maintaining it at the desired temperature ready for use at any time.

Another object is to arrange the electrodes in the water in the container in such manner as to form vertically elongated and relatively narrow water gaps or spaces between them for the purpose of rapidly heating the intervening relatively thin columns of water and thereby to expidite the heating of the superposed body of water for quick delivery through a suitable overflow or discharge nozzle in the top of the container.

Another object is to insulate these relatively thin columns of water from the main body of water in the container throughout the lengths of the electrodes, leaving the lower and upper ends of the intervening gaps or spaces open for the passage of water therethrough for the purpose of further expediting the heating of the water in transit from the inlet in the bottom of the container to the outlet or overflow.

Under this construction and arrangement of electrodes it is found that the thin columns of water between the electrodes are rapidly converted into vapor or steam which, of course, tends to rise to the surface but being opposed by the resistance of the superposed body of water tends to depress the thin columns downwardly toward the bottom of the electrodes until the upward pressure of the vapor or steam between the upper portions of the electrodes balances the downward pressure of the superposed body of water, thereby increasing the resistance in the steam or vapor portions of the gaps and diverting the electric energy to the remaining water-containing portions of the gaps so as to increase the heat therein and thereby to further expedite the heating of the entire body of water as another object of the invention.

It is also found that different kinds of water vary materially in their electric conductivity and by constructing and arranging the electrodes in the manner described enables these various kinds of water to be heated to the required temperature with practically uniform rapidity owing to the automatic regulation of the area of contact of the water with the electrodes through the relatively narrow vertical gaps as previously explained and constituting a still further object of the invention.

Other objects and uses relating to specific parts of the device will be brought out in the following description.

In the drawings:—

Figure 1 is a vertical sectional view of an electric water heater showing my improved electrodes.

Figure 2 is another vertical sectional view taken at right angles to that shown in Figure 1.

Figures 3 and 4 are horizontal sectional views taken respectively in the planes of lines 6—6 and 7—7 Figure 2.

As illustrated this electric water heater comprises an upright cylindrical water container —1— having a relatively small inlet —2— in its bottom —3— and a relatively larger outlet —4— in its top —5—, all of which parts may be formed of metal or other suitable material.

The major portion of the container —1— is surrounded by a metallic shell —6— extending from the bottom to the top thereof but in radially spaced relation thereto to form an intervening chamber which is filled with asbestos or other suitable heat insulating material —7— to form with the outer shell —6— a heat insulating jacket for the water containing cylinder —1—.

The outer shell —6— is also provided with a bottom section —8— closing the lower end of the chamber in which the heat insulating jacket —7— is placed and also extending across the major portion of the bottom —3— of the container in spaced relation thereto for receiving additional heat insulating material —9— of asbestos or equivalent substance, the object being to reduce radiation of the heat from the water containing cylinder —1—.

As previously stated the heat insulating jacket extends around the major portion of the water containing cylinder —1—, the remaining portions of the jacket being omitted to form a lengthwise recess —10— for receiving the thermostatic switch and housing therefor presently described and permitting the thermostatic bar to normally rest directly against the periphery of the water container —1— along a considerable portion of its length.

The bottom —8— of the heat insulating jacket may be secured by screws —11— to the bottom —3— of the water container —1— to assist in holding the container and jacket in fixed relation.

The heat insulating jacket is also provided with a top wall —12— secured to the adjacent ends of the shell —6— and container —1— by means of the cap —5— which in turn is secured to the upper end of the container —1— by screws —13— or equivalent fastening means, the top section —12— of the jacket being provided with a central opening of substantially the same diameter as the inner diameter of the container —1—, while the cap section —5— of the container closes the adjacent end thereof except as to the outlet —4—, the latter being preferably made in the form of a nozzle and secured directly to the cap section —5— as shown in Figure 1.

The inlet —2— may be provided with a suitable valve not shown adapted to be connected to any available source of cold water supply and while normally closed, may be opened whenever necessary to keep the container —1— substantially filled with water.

The discharge nozzle —4— is preferably left open to permit the overflow of hot water as may be required and also to permit the discharge of hot water for use when desired.

In other words, controlling the inlet —2— enables the operator to maintain a limited quantity or full capacity of water in the container —1— and to keep the temperature of the water at the desired degree of heat through the medium of the thermostatic switch presently described.

The electric heating element for heating the water in the container —1— is preferably supported in an upright position centrally therein and comprises a plurality of, in this instance, four carbon electrode bars —15— and —15′— of similar triangular cross section and of uniform length, arranged about a common axis preferably coincident with the axis of the container —1— and in transversely spaced relation to form relatively narrow intervening water gaps or spaces —16— extending lengthwise of and between the electrodes throughout the lengths thereof to permit the passage of water therethrough from end to end.

These electrodes are preferably arranged with their apexes facing the common axis and abutting against the corners of a central lengthwise core —17— of insulating material, such as porcelain, which is preferably square in cross section, said apexes being provided with lengthwise grooves —18— V-shaped in cross section to correspond to the angle of the corners of the core —17— to assist in holding the electrodes in the desired spaced relation.

These electrodes are enclosed in a suitable casing of insulating material consisting, in this instance, of opposed channel bars —19— and lower and upper end heads —20— and —20′— of porcelain or equivalent insulating material, the channel bars —19— being extended from end to end of the electrodes —15— and —15′— and entirely around the same and preferably in contact with the outer faces of said electrodes to further assist in holding the channel bars —19— and forming a substantially rectangular insulating casing for the electrodes, while the end heads —20— and —20′— are preferably circular and of greater diameter than the width of the channel bars, both heads being provided with relatively small vertical openings —21— therethrough in circumferentially spaced relation corresponding with the spaces or gaps —16— so as to register with the adjacent ends thereof and thereby to form continuations of the relatively narrow water passages —16— between the electrodes.

The opposite end heads —20— and —20′— are drawn tightly against the adjacent ends of the channel bars —19— by means of diametrically opposite bolts —22— which extend along the opposite outer faces of the bars —19— in suitable recesses —23— therein and also through vertically registering bolt openings in the heads so that when tightened they also draw the sections of the bars —19— end to end together to form water-tight joints between said sections and also between the heads and bars.

The central core —17— is also preferably made of sections arranged end to end so as to extend practically the entire distance between the end heads —20— and —20′— so that when the latter are tightened they also serve to hold the core sections in place against endwise movement.

These end heads —20— and —20′— also abut against the adjacent ends of the electrodes —15— and —15′— to hold the latter against relative endwise movement in the casing formed by the bars —19—.

The electrodes —15— and —15′— together with the core —17— bars —19— and end heads —20— and —20′— constitute what may be termed the "heating unit" which is suspended centrally within and lengthwise of the water container so as to leave a water space entirely around the sides and ends of the heating unit within the container thereby permitting said heating unit to be entirely surrounded by the water in the container.

This heating unit is preferably supported by the top or cap section —5— of the water container —1— so that it may be removed with said cap section by simply removing the clamping screws —13—, said supporting means consisting, in this instance of a pair of electric conducting bolts —24— having their lower ends provided with nuts —24'— seated in recesses —25— in the under side of the insulating head —20'— for electrical connection with a pair of springs —26— which are arranged in the recesses —25— to contact with the upper ends of two diametrically opposite electrodes —15—, said springs being placed under compression when the heads —20— and —20'— are drawn against the adjacent ends of the channel bars —19— by the bolts —22— for establishing positive electrical connection between the electrodes and supporting rods or bolts —24—.

These rods —24— are vertically alined with the longitudinal centers of the two electrodes with which the springs —26— contact and extend upwardly in parallel spaced relation through suitable openings in the top or cap section —5— where they are insulated from said cap section and from each other by sleeves —27— of insulating material and constitute binding posts —28— for electrical connection in the heating circuit in a manner presently described.

The portions of the rods —24—, the upper head —20'— and insulating sleeves —27— are enclosed in suitable tubes —29— of porcelain or other insulating material which are preferably made in sections secured end to end to form water-tight joints between the end head —20'— and insulating sleeves —27— when the conducting bolts —24— are tightened, it being understood that the upper ends of the rods —24— are threaded and provided with suitable nuts cooperating with the insulating sleeves —27— for firmly securing the rods —24— and their insulating tubes —29— to the cap section —5—.

Temperature regulator.

The temperature of the water in the container is preferably regulated by controlling the current to the electrodes through the medium of the binding posts —28— and rods —24— and an electro-thermostatic switch which is preferably arranged in the recess —10— in the outer shell —6— and protected by a cover —6'—.

For this purpose a flat thermostatic bar —30— is secured at its lower end to the base of the cylinder —1— within the recess —10— and extends upwardly along and in close proximity to the adjacent side of the container —1— to receive the heat transmitted thereto by the heating of the water within the container, said thermostatic bar being arranged to move its free end away from the container as the temperature increases.

An adjusting screw —31— on the lower portion of the container —1— serves to adjust and set the bar —30— to the desired position for controlling the heating circuit to give the desired temperature of the water.

An insulating block —32— is secured to one side of the upper end of the container —1— within the recess —10— for receiving and supporting a pair of switch terminals —33— which are adapted to be connected to any available source of current supply for the heating unit and lead to the upper ends of a pair of movable switch members —34— which extend vertically within the recess —10— and are pivoted at their lower ends at —35— to a supporting frame —36—, the latter being also secured to the insulating block —32—.

These movable switch members —34— are normally closed against the cooperative contacts of the terminals —33— by retracting springs —37— which are electrically connected to their respective members —34— and contact with fixed terminals —38— on the insulating block —32—.

These terminals —38— are electrically connected by wires —39— to their respective binding posts —28— of the electrode rods —24— so that when the terminals —33— are connected to the source of supply the current will normally flow through the terminals —33—, switch members —34—, springs —37—, terminals —38— and wires —39— to the electrodes which are connected to the rods —24— thereby causing the heating of the water in the container —1—.

The container —1— is kept substantially filled with water which, although surrounding the heater, does not come in contact with the electrodes except as it rises through the perforations —21— in the lower head —20— and thence upwardly through the registering gaps —16— and outwardly through the apertures —21— in the upper head —20'—.

The electric current transmitted to the electrodes therefore acts directly upon the relatively thin vertical columns of water, thereby causing a rapid heating of said water columns and more or less vaporization thereof into steam which, owing to its buoyancy, tends to rise to the surface of the water in the container but on account of the resistance of the overlying body of the water to the upward movement of the steam or vapor globules, the water columns in the gaps are caused to recede downwardly by the pressure of the steam or vapor.

The presence of the steam or vapor in the upper portions of the vertical water gaps causes the current in the electrodes to be concentrated to the water containing portions of the gaps thereby increasing the heat therein and consequently accelerating the conversion of the water into steam or vapor which is instantly transmitted to the superposed body of the water in the container and incidentally produces a quicker heating of said superposed body which is gradually transmitted to the remaining portions of the water in the container.

In other words, this arrangement of the heater elements enables the cold water to be quickly heated, particularly at the top where it may be drawn off and used as desired and the amount drawn off replaced by the opening of the valve —14—.

It is, of course, understood that this device is to be used for supplying small quantities of hot water only which is kept in storage in the tank —1— to be used as needed and when not in use is kept at the desired temperature by the automatic action of the thermostatic switch.

*Operation.*

Assuming that the heating circuit is closed by contact of the switch members —34— with the terminals —33— and that the valve —14— is temporarily opened to admit water to the interior of the container, in which case as soon as the water level reaches the electrodes, relatively thin columns thereof will gradually rise through the gaps —16— between the electrodes and therefore the current will pass from one electrode to the other through the more highly resistant water column.

Owing to the fact that the columns of water in the intervening gaps between the electrodes are relatively small, the electrical resistance thereof causes said water columns to become rapidly heated from the bottom upward and that this rapidity of heating is inversely proportionate to the height of the column. That is, the lower the water levels in the gaps, the more rapidly will they become heated.

Now, as the water level in the container rises to the top thereof or some distance above the electrodes, the valve —14— may be closed while the heat developed in the water columns in the gaps —16— continues thereby converting more or less of the water in said columns into steam or vapor globules which tend to rise to the surface of the water and therefore collect more or less in the upper portions of the gaps —16— by reason of the resistance of the superposed body of water.

This trapping of the steam or vapor in the upper portions of the gaps or spaces —16— between the electrodes causes more or less downward recession of the level of the water columns therein due to the pressure of the superposed body of water, thereby causing an increased concentration of the current energy into the shortened columns and consequently increasing the conversion thereof into steam or vapor which of course imparts its heat to the superposed body of water until the desired temperature is attained, the height of the water columns in the gaps between the electrodes depending somewhat upon the superposed body of water and also upon the rapidity of conversion of the water columns into steam or vapor and may also depend partially upon the quality or electric conductivity of water in the container.

As the temperature of the water in the container increases the heat is transmitted to the thermostatic bar —30— and when such temperature approaches the required degree the free end of the bar —30— engages and operates the movable switch members —34— to break the heating circuit, while on the other hand, if the temperature of the water in the container drops below the required degree the bar —30— will automatically recede from the switch member —34— to allow the latter to close the circuit, thereby establishing an automatic regulation of the current supply to the heater with a resultant economy in the amount of current used.

The construction shown and described is particularly efficient in maintaining a limited supply of hot water ready for use at any time and is also economical in consumption of electric current but it is evident that various changes may be made in the detailed construction of the thermostatic control and in other parts of the device without departing from the spirit of the invention.

What I claim is:—

1. In an electric water heater, a plurality of vertically elongated electrodes arranged in circumferentially spaced relation about a common axis, the spaces between the electrodes being continuous from end to end thereof and means for limiting the contact of the water to the sides of the electrodes adjacent the spaces.

2. In an electric water heater, vertically elongated electrodes arranged in circumferentially spaced relation about a common axis to form relatively narrow water passages extending from end to end of the electrodes, and means for excluding the water from contact with portions of the electrodes other than those adjacent the spaces.

3. In an electric water heater, a plurality of vertically elongated electrodes arranged in circumferentially spaced relation about a common axis to form relatively narrow water passages between them, a casing of insulating material surrounding the electrodes and provided with openings in its top and bottom communicating with said passages to allow the water to pass into the spaces.

4. In an electric water heater, a core of insulating material, a plurality of vertically elongated electrodes arranged in relatively close circumferentially spaced relation around and upon the core and a casing of insulating material surrounding the electrodes and having openings in the bottom and top thereof communicating with the spaces between the electrodes.

In witness whereof I have hereunto set my hand this 15th day of November, 1924.

ALPHONSE MARTIN.